United States Patent
Johnson

[11] 3,859,730
[45] Jan. 14, 1975

[54] SCREW THREAD GAGE USING DRAG FOR TESTING

[75] Inventor: Stanley G. Johnson, West Hartford, Conn.

[73] Assignee: The Johnson Gage Company, Bloomfield, Conn.

[22] Filed: Oct. 23, 1970

[21] Appl. No.: 83,276

Related U.S. Application Data

[63] Continuation-in-part of Ser. No. 841,227, July 14, 1969, abandoned.

[52] U.S. Cl. .................................. 33/199 R, 73/9
[51] Int. Cl. ........ G01b 3/00, G01b 3/40, G01b 3/48
[58] Field of Search ............. 73/9; 33/199 R, 178 R, 33/148 R

[56] References Cited
UNITED STATES PATENTS

| | | | |
|---|---|---|---|
| 2,470,254 | 5/1946 | Lee | 33/199 R X |
| 2,509,886 | 5/1950 | Sachtleber | 33/199 R X |
| 2,782,523 | 2/1957 | Swanson | 33/199 R |
| 2,784,494 | 3/1957 | Aldeborgh et al. | 33/199 R X |
| 3,090,126 | 5/1963 | Kernoski | 33/199 R X |

FOREIGN PATENTS OR APPLICATIONS

| | | | |
|---|---|---|---|
| 124,001 | 3/1919 | Great Britain | 33/199 R |
| 102,573 | 12/1916 | Great Britain | 33/199 R |

Primary Examiner—Richard C. Queisser
Assistant Examiner—Daniel M. Yasich
Attorney, Agent, or Firm—John M. Montstream

[57] ABSTRACT

The invention disclosed is a screw thread gage for internal and external threads which is simple in construction in lacking a scale or the like and hence is relatively inexpensive to manufacture. Both internal and external thread gages use a pair of gaging members with the internal gage having members which are spaced apart far enough so that they will contract sufficiently for axial insertion into the threaded hole. The gaging members are pressed resiliently outwardly for an internal gage and inwardly for an external gage. A stop means is set at one of the limiting tolerance dimensions and limits the outward expansion or inward contraction of the gaging members to that dimension. The accuracy of the thread is determined by three degrees of frictional drag or feel between the gage and the test part when one is turned on the other. The gage may include lock means to lock a gaging member against its stop means and/or squareness of face testing means.

5 Claims, 10 Drawing Figures

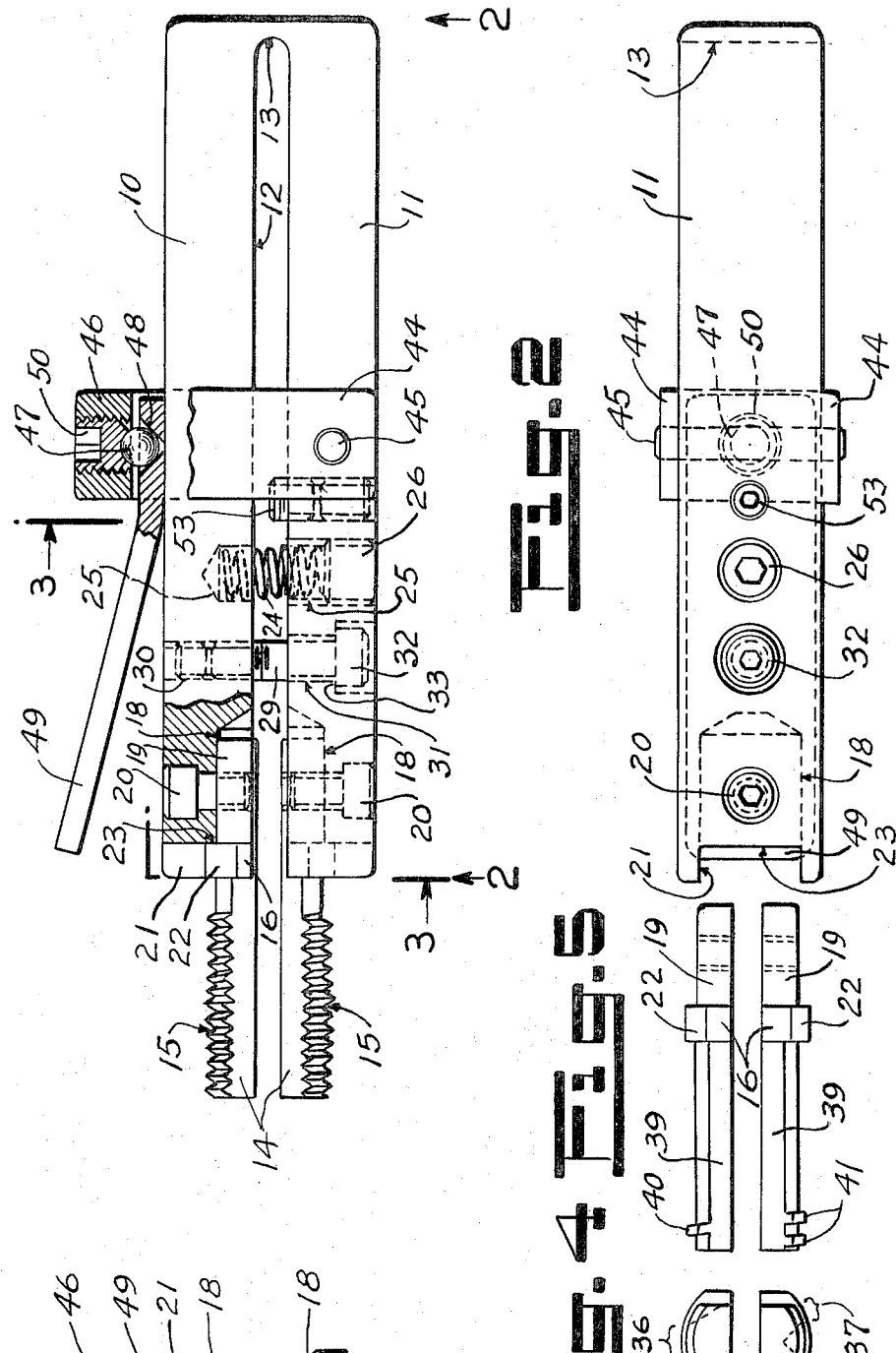

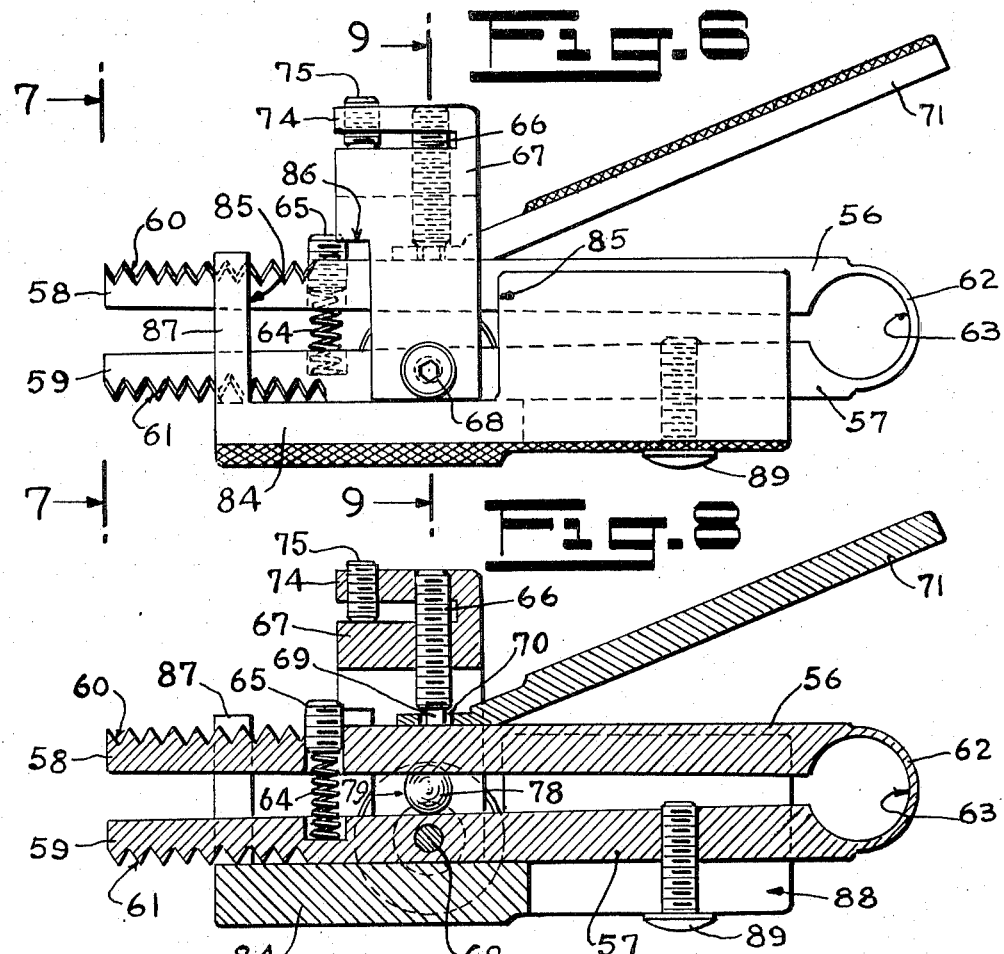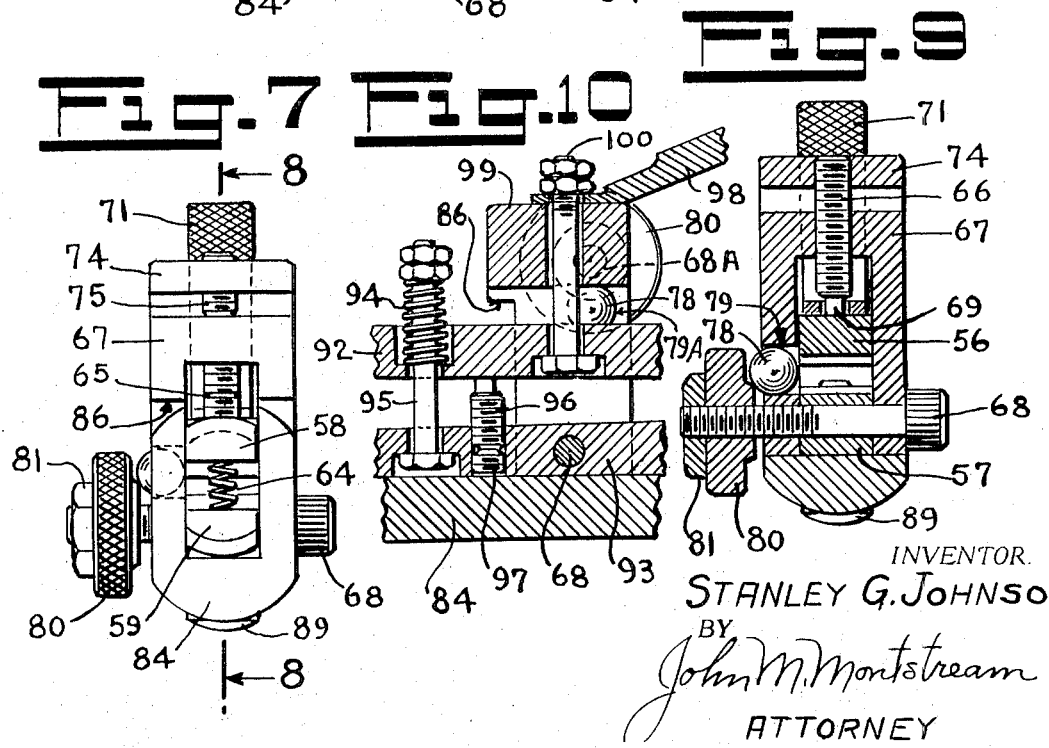

SCREW THREAD GAGE USING DRAG FOR TESTING

This application is a continuation-in-part of my application Ser. No. 841,227 filed July 14, 1969, and now abandoned.

The screw thread gage disclosed is simplified by dispensing with a scale or its equivalent and uses frictional drag between the gage and the test part to determine whether or not the thread is within its tolerance dimension. With the stop means set at a tolerance limit so as to give a light drag between the gage and the test part, a test thread with this drag is acceptable. With a gage set at the maximum material limit, a heavy drag indicates that an internal thread is too small and an external thread is too large for assemble-ability with its mating thread. With a gage set at the minimum material limit, a heavy drag indicates an acceptable thread and no drag tells that an internal thread is too large and an external thread is too small. These differences in drag is sufficiently precise to give an adequate test of the acceptability and the rejection of a thread for a great many applications.

The principle object of the invention is to construct a relatively inexpensive screw thread gage having resiliently expandable or contractable gaging members which gage dispenses with a scale or indicator of some kind to give a dimensional reading through the whole tolerance range for each test thread and uses instead a fixed and precisely located stop setting for the members at one tolerance limit and acceptability and rejection is determined by use of three degrees of frictional drag when the test part or the gage is turned one on the other. A light drag indicates a thread having an acceptable dimension at either tolerance limit. For a maximum material limit no drag is also acceptable and a heavy drag tells that the thread is outside of its tolerance limit and will not, or will not acceptably assemble with its mating thread. For a minimum material limit, no drag indicates that the test thread lacks acceptable holding power when threaded on its mating thread and heavy drag indicates an acceptable thread also and within tolerance limits. An external or internal thread gage with plural gaging ridges, FIGS. 1 and 6, are used for maximum material limits and gages with gaging surfaces, as in FIG. 5, are used for minimum material limits. Another object is to construct a gage as above which provides a sharp cut-off point for the limiting dimension for which it is set.

Another object is as in the preceeding paragraphs but includes a frame having a pair of spaced arms and each arm is provided with a socket for its gaging member so that the frame may be used for any number of different sizes of gaging members or different forms of thread ridge merely by replacing the gaging members.

A still further object is to provide a limit means to limit also the contraction or expansion of the gaging members to provide a test of the minor or major diameter of a test internal or external thread.

A further object is to construct a gage as above but mount the stop means on a lever frame which location is simpler to manufacture and it may also serve to retain an operating lever assembled therewith.

Another object is as above and to provide the gage with a simple squareness of face and depth of thread means.

Another object is as above and includes means to lock the gaging members at the fixed stop means setting.

Other objects of the invention will be more apparent from the following description when taken in connection with the accompanying drawings illustrating preferred embodiments thereof in which:

FIG. 1 is a side view of the gage with parts in section;
FIG. 2 is a bottom view of the gage;
FIG. 3 is an end view taken on line 3—3 of FIG. 1 without the gaging members;
FIG. 4 is an end view of the gaging members of FIG. 1 or 5 and some variations thereof;
FIG. 5 is a side view of gaging means having a pitch diameter form of gaging ridges;
FIG. 6 is a side view of the gage with squareness testing means and gaging member locking means;
FIG. 7 is an end view of the gage of FIG. 6;
FIG. 8 is a sectional view taken on line 8—8 of FIG. 7;
FIG. 9 is a cross sectional view taken on line 9—9 of FIG. 6; and,
FIG. 10 is a partial longitudinal section of a gage for an external thread.

The gage includes a main frame comprising arms 10 and 11 which are hingedly connected together in any suitable manner. The frame shown is an integral member having an axial slot 12 extending practically the full length of the member but leaving a narrow connecting portion 13 so that it serves as a hinge and could serve as an expansion or contraction spring as well. At the other end of each arm of the frame there is carried a gaging member 14 having a screw threaded gaging surface 15. The two gaging members are spaced apart a sufficient distance or the slot has a dimension between the gaging members so that when contracted the gaging members will clear the thread in the test hole when axially projected thereinto. This also requires that the threads at the sides be lacking or if provided in the manufacture they are to be milled away for clearance.

The gaging members may be integral with the frame, however, preferably they are separate parts removably mounted on the frame so that they can be replaced by screw threaded gaging members of other sizes or diameters or another form of gaging ridge of the same diameter. Each arm, therefore, carries a socket 18 to receive a stem 19 of its gaging member. A screw 20 secures the respective gaging member in its socket. The frame desirably has a flat sided recess or notch 21 in the end thereof which receives the flat sides 16 on the respective gaging members provided by milling the sides of the annular flange 22. These flat sides engage the sides of the notch to assure proper positioning of the gage members on the frame. The bottom surface 23 of the notch is engaged by the side of the flange to locate the two gaging members in proper axial relation.

The hinge 13 may provide sufficient resiliency to expand or contract the gaging members, however, it is desirable to provide additional resiliency. A separate spring means 24 is provided, the ends of which are received in a bore 25 in the arms 10 and 11 and a screw 26 may be used to back up the spring as well as adjust the compression in the spring.

Stop means is provided to limit the expansion of the gaging members. A suitable stop is that shown in the form of a stop or limit screw 29 which is threaded into a hole 30 in one arm 10. The other arm has a hole 31 in which the stop screw is freely movable. The expansion stop screw has a head 32 which engages a countersink shoulder 33 and thereby limits the expansion of the gaging members to the desired test diameter which limit may be adjusted by the screw to the desired test setting.

The form of the engaging members may be different, for example, the gaging surface 15 is a plurality of thread ridges corresponding with the internal test thread for contacting substantially the full depth of the threaded hole for a test of the overall assemble-ability of the threaded hole with the bolt or screw to be received therein. FIG. 4 is an end view of gaging members 14 and 39, however, the dot-dash lines indicate the manner in which the gaging surfaces may be modified to provide a narrower thread contact 36 on one gaging member and a pair of spaced gaging surfaces 37 formed by milling a central groove lengthwise of the other gaging member. In fact both gaging members may be so grooved to provide four point contact.

FIG. 5 shows gaging members 39 with a cone gaging ridge 40 on one gaging member and a V-type gaging ridge 41 on the other gaging member for narrow pitch circle contact of the gaging ridges with the test thread. Other forms of gaging surfaces may be used as well as a broad range of sizes.

It is desirable that the resiliency expanding and contracting the gaging members be reasonably heavy and it would be too tiring if the gaging members were operated without any leverage. It is advisable to provide operating means to contract the gaging members against the pressure of the spring means 13 and 24. The operating means illustrated comprises a lever frame 44 of U-shaped construction which straddles both arms and is secured to the arm 11 of the frame such as by a pin 45. This lever frame has a cross member 46 spaced from the arm 10 and carrying pivot such as a ball 47 which engages in a cone shaped recess 48 in an operating lever 49. Preferably the cross member has a screw 50 therein engaging the ball pivot 47 so that the lever and the ball may be inserted between the cross member and the arm 10 and the ball and lever retained in operating position. Depressing the lever 49 contracts the gaging members. A contracting limit screw 53 may be carried by one arm such as the arm 11 so that when the gaging members are contracted the surface of the slot 12 of the arm 10 engages the end of this limit screw and limits the extent of the contraction. This limit screw may be set such that if the gaging members can not be inserted into the threaded hole it indicates that the minimum diameter of the threaded hole is too small. This contracting limit screw or means is better adapted to the pitch diameter form of gaging ridges illustrated in FIG. 5 or the gaging ridges could be full form but of the single cone ridge and double V-ridge since long gaging elements 14 have a gaging surface 15 of considerable length so that they will taper when in contracted position and not best suited for a minimum diameter test.

The stop screw 29 and the limit screw 53 may be of any suitable lock screw type so that they remain in adjusted position. A bent screw form is illustrated.

FIGS. 6 to 9 illustrate improvements and additions which have been made to the structure of FIGS. 1 to 5. A main frame includes spaced arms 56 and 57 each having a gaging member 58 and 59 respectively with a gaging surface 60 and 61 at the end thereof. The gages of FIG. 1 and 6 are essentially the same except that the screw thread gaging members of the gage of FIG. 6 are not shown as removable and replaceable with another size although they could be so constructed if desired. Also the hinge 62 is formed with an enlarged opening or hole 63 between the arms which lengthens the hinge and improves its flexibility and locates the connection between the arms and the hinge at the outer surface of each arm. A spring 64 having an adjusting screw 65 applies expansion pressure to the gaging members in addition to that supplied by the hinge.

The principal change made to the gage of FIG. 1 is to locate the stop means 66, shown as a screw, in the lever frame 67. Since this frame is secured or clamped to the gaging member or arm 57 by a screw 68, it forms part of this gaging member. The end of the stop means engages the other gaging member to limit the expansion thereof to the maximum acceptable size for an internal thread, and the acceptability or rejection of the test thread is determined by the three degrees of frictional drag noted when the test part or gage is turned one on the other as discussed above. The stop screw has a nub 69 on its end which passes through a hole 70 in an operating lever 71 so that this stop means serves a double function in also retaining the lever in assembled and operative position to contract the arms against the spring pressure. The hole in the lever is sufficiently larger than the nub so that pivoting of the lever and setting of the stop means is not interfered with.

The lever frame has a slot therein extending at least to the opposite edge of the stop screw which slot provides a flexible clamp 74. A lock screw 75 passes through the clamp and its end engages the opposite side of the slot. Spreading of the clamp by this lock screw clamps the stop screw in adjusted position.

One addition to the gage of FIG. 1 is an arm locking means which locks the movable arm 56 in fixed position. An economical locking means includes a ball 78, FIG. 9, in a ball hole 79 passing through one side of the lever frame. A ball nut 80 conveniently carried by an extension of the frame clamping screw 68 propels the ball partially between the arms 56 and 57 so that the arm 56 is clamped between the ball and the stop means screw 66 in expanded position. This arm locking means is used when a test thread seems to have no drag but it is uncertain. By locking the arm is fixed position and giving the test part the drag test if the drag is now evident then the test thread is acceptable. If, however, no drag is noted, then the test thread is too large. The locking of the arm in fixed position converts the gage into a thread plug and the gage can be used for this purpose in addition. When used as a thread plug, the stop means provides means for adjusting the size of the plug. The ball can be used in several ways such as being larger than the space between the inner or adjacent surfaces of the arms and is pressed by the nut 80 between the arms using the curvature of the ball as a wedge. In the construction particularly shown, the ball is pressed between the bottom adjacent corner of the arm 56 and the opposite wall of the ball hole 79. This occurs because the bottom surface of the ball hole is in alignment with the top surface of the arm 57, but again using the curvature of the ball as a wedge. A nut 81 secured on the end of the screw 68 provides a stop for the ball nut 80. In non-clamping position of the ball, the arm 56 does not engage the same.

Another addition to the gage is a squareness tester or member which is slidable on the arms and is used to test the squareness of face of the test part with respect to the thread. The sides of the arms 58 and 59 are ground and the squareness member 84 is U-shaped to receive at least one arm thereof but preferably receiving both arms. This member has a cut-out 85 or wide notch for the lever frame 67 and the latter may have a cut-out 86 at its front end to receive the end 87 of the squareness member. This member has a longitudinally extending slot 88 which receives a clamping screw 89 threaded into the arm 57 to retain the member slidably thereon and also to clamp the member in adjusted position, when desired.

With a threaded test part on the gage, the squareness member is moved into contact with the face of the test part. Squareness can be sighted by light or lack of light showing between the face of the test part and the end of the squareness member. If a more precise test of any lack of squareness is desired, blades or shims of known thickness can be projected therebetween for a measurement of the amount by which the face lacks squareness. The squareness member can also be used to test the depth of a thread by clamping the member with its end at the required depth from the end of the threaded gaging surfaces 58,59. If the test thread can be threaded to the end of the squareness member then it is known that the depth of the thread is sufficient.

The gage described is suitable for testing external screw threads by using gaging members with internal gaging surfaces (not shown) to receive such threads. The three degrees of feel or frictional drag between the test screw thread and the gage when turned one on the other is used for determining the acceptability or rejection of the thread. The gaging members 92 and 93, FIG. 10, have spring means 94 mounted on a bolt 95 which is carried by member 93 to contract the gaging members into contact with the test thread. The gaging surfaces will be of the plural thread form for the maximum material limit and cone and V for the minimum material limit. A stop means 96 with lock screw 97 is provided and set at one tolerance limiting dimension to limit contractile movement of the gaging members. An operating lever 98 rests on lever frame 99 and pulls upwardly on a lever bolt 100 which is connected with the gaging member 92 to spread the members apart for axially receiving and removing the test part from the gage.

The gage of FIG. 10 shows locking means for locking the second gaging member 92 against the stop means 96. This locking means includes the ball 78 in a hole 79A through one side of the lever frame 99 and pressed between the top under surface of the lever frame and the gaging member 92 by the nut 80 carried on a screw 68A. The curvature of the ball serves as a wedge. This locking means is used in the same manner as that of the gage of FIGS. 6 to 9 and converts this gage into a ring gage. The stop means serves as an adjustment for the size thereof.

The gaging member carrying the lever frame 46, or the lower arm, is a first gaging member and the other arm is a second gaging member. In FIGS. 6 to 9, the first gaging member is 57 and in FIG. 10 it is 93.

The setting of the stop means for a gage for an internal thread may be made with a master ring or a thread micrometer with cone and V-anvils and measuring or set to the maximum or minimum pitch diameter tolerance limit of the thread. The setting of the stop means for a gage for an external thread may be made with a master plug or the internal gage herein when set to the proper tolerance limit dimension.

The spring means is not critical and can vary as to form, dimension and adjustment. The gage illustrated for a ½-inch thread uses a spring about one eighth of an inch in diameter.

The stop means is set at the limit of acceptability for gages for maximum and minimum material limits for both external and internal gages and at this setting a light drag is felt. The stop means then provides a cut-off side which is that side of the limiting dimension or stop means setting where the test is of such dimension that the spring means pressure is cut-off and consequently no drag is felt. The stop means also provides a spring means pressure side where the pressure of the spring means is an effect and provides a heavy drag when the test part is of such dimension that the gaging members are on this side of the tolerance limit setting of the stop means. For a maximum material gage, a test part which is engaged by the gaging members on the cut-off side of the tolerance limit whether an internal or external thread gage, the test thread provides no drag and is acceptable whereas if engaged on the spring means pressure side of the tolerance limit a heavy drag results and the thread is not acceptable since it will not assemble or acceptably assemble with its mating thread. For a minimum material gage, a test part which is not engaged by the gaging members on the cut-off side of the tolerance limit whether an internal or external thread gage, the test part is unacceptable since the test part will be too loose on its mating thread for adequate holding power whereas if engaged on the spring means pressure side, the test part is acceptable. Note that the drag factor is opposite as to these two forms of gages.

A complete test then is with a maximum material gage and a minimum material gage each having its stop means set at its tolerance limit dimension. In each gage the transition from no drag to heavy drag is about 0.0001 to 0.0003 of an inch for a ½-inch diameter thread. The test could be made with a gage for the minimum material test as described herein and the maximum material test could be made with a thread plug for an internal thread or a ring gage for an external thread.

The gaging members within the small gaging range between no drag and heavy drag expand and contract in parallel or substantially parallel movement. A hinge provides parallel or essentially parallel movement when the hinge is far enough distant from the gaging surfaces and provides a relatively simple form of parallel movement means.

This invention is presented to fill a need for improvements in a Screw Thread Gage using Drag for Testing. It is understood that various modifications in structure, as well as changes in mode of operation, assembly and manner of use, may and often do occur to those skilled in the art, especially after benefiting from the teachings of an invention. This disclosure illustrates the preferred means of embodying the invention in useful form.

What is claimed is:

1. A screw thread gage for internal (or external) screw threads using three degrees of frictional drag by turning the gage or the test part one on the other for accepting or rejecting a test thread comprising a single pair of gaging members including a first member and a second member spaced from each other providing a slot therebetween, the slot permitting contraction (for internal thread gaging members) and expansion of the (for external thread) gaging members for axially positioning of the gaging members on the test thread, each gaging member having a cooperating thread gaging surface thereon, connecting and spring means securing the gaging members together for parallel or substantially parallel movement and resiliently pressing the gaging members in a direction to engage the test thread, precisely located and fixed stop means carried by one member and engaging the other member and limiting expansion of said gaging members, (having gaging surfaces for internal threads and limiting contraction of gaging members having gaging surfaces for external threads) the precise location of the stop means being at (one of) the maximum limiting tolerance dimension(s) of the test thread at which setting the frictional drag solely is used and is light for an acceptable thread, the stop means providing a sharp cut-off of spring means pressure for a test thread larger than (and providing a cut-off side of) this limiting dimension and (on which side) no drag is felt, and the resiliency of the connecting and spring means being such that a heavy frictional drag is felt when the test part or gage is turned one on the other with a test part (outside of) smaller than the minimum tolerance limit, and (being engaged by the gaging members on the spring means pressure side of the stop means) including lock means selectively engaging the second gaging member to lock the same against the stop means.

2. A screw thread gage as in claim 1 including a lever frame carried by the first gaging member and straddling the second member and in which the lock means includes a ball received in a hole in the lever frame adjacent to the second gaging member, and means to press the ball against the second gaging member to lock the same against the stop means.

3. A screw thread gage as in claim 2 in which the thread gaging surfaces are for an internal thread including a securing screw projecting through the first gaging member and the lever frame to secure the latter thereon, the hole and ball being located in alignment with the slot between the gaging members, and a nut carried by the securing screw and engaging the ball to press the same between the gaging members.

4. A screw thread gage for internal (or external) screw threads using three degrees of frictional drag by turning the gage or the test part one on the other for accepting or rejecting a test thread comprising a single pair of gaging members including a first member and a second member spaced from each other providing a slot therebetween, the slot permitting contraction (for internal thread gaging members) and expansion of the (for external thread) gaging members for axially positioning of the gaging members on the test thread, each gaging member having a cooperating thread gaging surface thereon, connecting and spring means securing the gaging members together for parallel or substantially parallel movement and resiliently pressing the gaging members in a direction to engage the test thread, precisely located and fixed stop means carried by one member and engaging the other member and limiting expansion of said gaging members, (having gaging surfaces for internal threads and limiting contraction of gaging members having gaging surfaces for external threads) the precise location of the stop means being at (one of) the maximum limiting tolerance dimension(s) of the test thread at which setting the frictional drag solely is used and is light for an acceptable thread, the stop means providing a sharp cut-off of spring means pressure for a test thread larger than (and providing a cut-off side of) this limiting dimension and (on which side) no drag is felt, and the resiliency of the connecting and spring means being such that a heavy frictional drag is felt when the test part or gage is turned one on the other with a test part (outside of) smaller than the minimum tolerance limit, (being engaged by the gaging members on the spring means pressure side of the stop means) the thread gaging surface having an axis including longitudinally extending flat sides on opposite sides of at least one of the gaging members, and a squareness test member adjustably mounted on the flat sides of the gaging members and having a squared end with respect to the thread gaging surface axis for contact with the end face of the test part.

5. A screw thread gage as in claim 4 including a lever frame carried by the first gaging member and straddling the second gaging member and in which the squareness member is U-shaped and straddles the gaging members and has cut-outs on each side thereof for the lever frame.

* * * * *